March 3, 1970 J. A. GEE ET AL 3,499,123

GROUP SELECTING ARRANGEMENT FOR AUTOMATIC TELEPHONE SYSTEMS USING CROSSPOINT RELAY MATRIX SWITCHES

Filed Nov. 15, 1966 5 Sheets-Sheet 1

March 3, 1970 J. A. GEE ET AL 3,499,123
GROUP SELECTING ARRANGEMENT FOR AUTOMATIC TELEPHONE SYSTEMS USING CROSSPOINT RELAY MATRIX SWITCHES
Filed Nov. 15, 1966 5 Sheets-Sheet 3

United States Patent Office 3,499,123

Patented Mar. 3, 1970

3,499,123
GROUP SELECTING ARRANGEMENT FOR AUTOMATIC TELEPHONE SYSTEMS USING CROSSPOINT RELAY MATRIX SWITCHES

John Arthur Gee, Donald Frank Rigby, and Donald Kelson, London, and William Archibald Charles Hemmings and Peter Samuel Hampson, Liverpool, England, assignors to Automatic Telephone & Electric Company Limited, Liverpool, England, a British company, and Her Majesty's Postmaster General of Great Britain, London, England Filed Nov. 15, 1966, Ser. No. 594,514
Claims priority, application Great Britain, Nov. 18, 1965, 48,962/65
Int. Cl. H04m 3/00
U.S. Cl. 179—18 14 Claims

ABSTRACT OF THE DISCLOSURE

A group selector arrangement for a telephone system consists of at least one switching network comprising a plurality of primary and secondary matrix switches using electromagnetic crosspoint relays. The primary and secondary switches are link-connected so that each primary switch is connected to each secondary switch and the outlets of the secondary switches are formed into levels each consisting of corresponding outlets of the secondary switches. Control equipment can be operatively associated exclusively with any one inlet to the primary switches and includes a call isolator for determining the primary switch inlet and for defining all the links extending from such primary switch; a register to which digital signals are applied; an interrogator and trunk marker for interrogating, as to their idle or busy conditions, the outlets of the level defined by the digital signals; a path selector for nominating for use one of the available outlets in the required level and its associated link and for operating a crosspoint relay in the primary switch to connect the calling inlet to the nominated link, the operation of a crosspoint relay in the secondary switch to connect the nominated link to the nominated outlet being effected by the interrogator and trunk marker. The control unit also includes a variable availability device which enables two levels to be combined to form one group.

Figure 1:
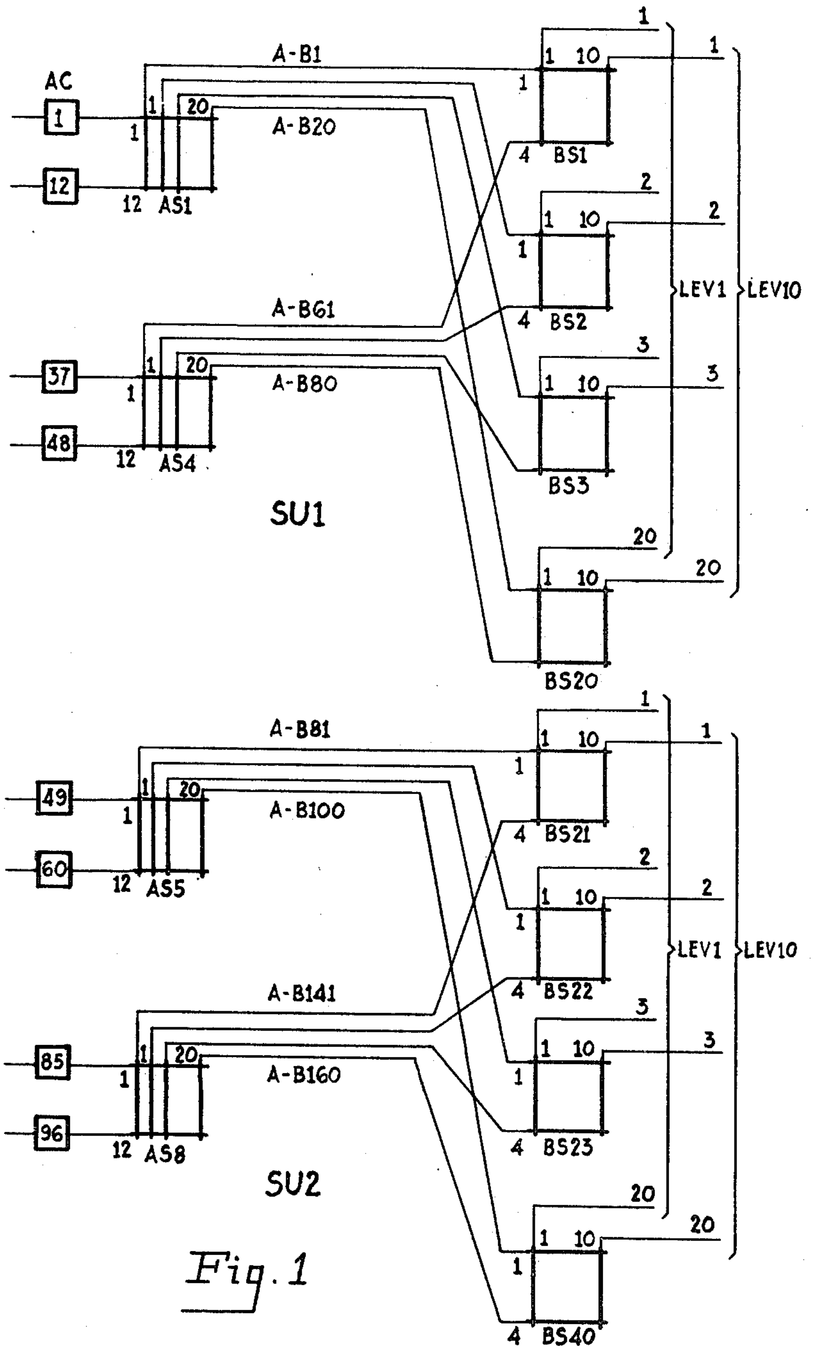

The present invention relates to automatic telephone systems and is more particularly concerned with group selectors for use in such systems.

Co-ordinate or matrix switches of the kind involving so-called crosspoint relays are well known and are finding increasing application in telephone exchange switching networks. A switch of this type, having a plurality of inlets and a plurality of outlets, enables any inlet to be connected to any outlet by the operation of the appropriate crosspoint relay. Preferably, but not essentially, the crosspoint relays are each of the so-called reed type having a plurality of individually encapsulated contact units adapted for actuation by a magnetic field which is impressed upon them when an associated electrical winding is energised.

It is already known to use a plurality of these co-ordinate switches as the switching network of a group selector. Typically such a switching network comprises two ranks of switches, A (primary) switches and B (secondary) switches, and the network inlets are provided by the inlets of the A switches, the network outlets (arranged in digitally selectable groups) are provided by the outlets of the B switches, and link connections are used between the outlets of the A switches and the inlets of the B switches. The arrangement is such as to enable any inlet of the network to be selectively connected to any outlet thereof.

A switching network of this kind, provided with control equipment for setting up connections expeditiously on a one-at-a-time basis and arranged for the maintenance of established connections independently of the control equipment, can be equated to a plurality of electromechanical two-motion selectors of the kind having a single inlet. Thus a known group selector switching network, involving eight 12 x 20 (twelve inlets and twenty outlets) A switches and twenty 8 x 10 B switches and providing all of 96 inlets with access to ten groups of twenty outlets over 160 links, may be broadly equated to 96 200-outlet group selectors of the electromechanical two-motion type.

An object of the present invention is to provide a reliable and efficient selection and control arrangement for group selector switching networks of the kind referred to.

According to one aspect of the invention in a group selector arrangement including at least one switching network comprising a plurality of link-connected primary and secondary matrix switches having electromagnetic crosspoint relays, the inlets of the switching network being the inlets of the primary switches and having access circuits individual thereto, the outlets of the switching network being formed into levels each comprising corresponding outlets of the secondary switches, control equipment for the switching network is adapted to be rendered operative exclusively in respect of any one seized access circuit and includes means for defining those links which emanate from the primary switch serving the particular access circuit, means for interrogating, as to their idle or busy states, the outlets of a digitally-defined level each in conjunction with those of the defined links giving access to said outlets and means which nominate for use one idle outlet and its related link of those interrogated, the control equipment being arranged to cause the particular access circuit to extend a marking potential to the particular inlet of the switching network which marking potential together with marking conditions provided by the control equipment, and which are appropriate to the nominated link and all outlets of the defined level, first to cause the access circuit to be connected to the link by the operation of a unique crosspoint relay of the particular primary switch and then the link to be connected to the nominated outlet by the operation of a unique crosspoint relay of a particular secondary switch.

According to another aspect of the invention in a group selector arrangement including two switching networks each comprising a plurality of link-connected primary and secondary switches having electromagnetic crosspoint relays, the inlets of each switching network being the inlets of the primary switches of the particular network and having individual access circuits, the outlets of each switching network being formed into levels each comprising corresponding outlets of the secondary switches of the particular network, a control equipment, provided for both switching networks in combination, is arranged to be operatively connected to any one seized access circuit of either network on a mutually exclusive basis and to be conditioned according to the identity of the switching network serving said access circuit whereby it is determined that the control equipment shall be operative upon that switching network exclusively in respect of a digitally-selected group comprising at least one outlet level of the particular switching network.

According to a further feature of the invention in a selector arrangement including a switching network comprising a succession of multi-inlet and multi-outlet co-ordinate switches having electromagnetic crosspoint relays, the inlets having access circuits individual thereto and the access circuits being arranged to establish appropriate identity-significant connections to a discriminating means whereby the latter is adapted to control connector means to operationally connect the access circuits, on a mutually exclusive basis to control equipment serving the switching network, at least some of the access circuits have first, second and third electromagnetic relays and an incoming path including first and second conductors, the first relay being actuated upon persistent application of a signal to the first conductor to prepare for actuation of the second relay on the subsequent occurrence of a signal at the second conductor, actuation of the second relay by the latter signal serving to establish the identity-significant connections to said discriminating means.

The invention will be better understood from the following description of one method of carrying it into effect which should be read in conjunction with the accompanying drawings comprising FIGS. 1 to 5.

Figure 2:
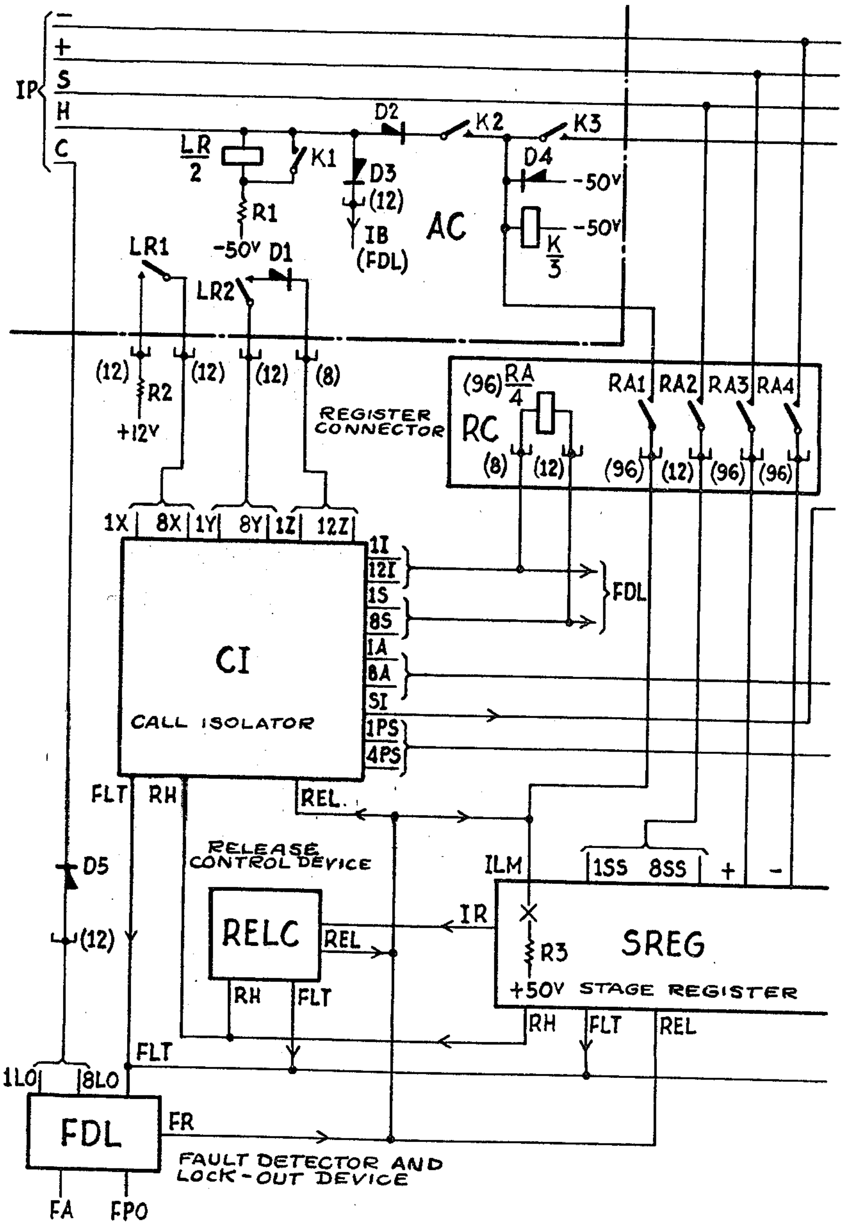
Figure 3:
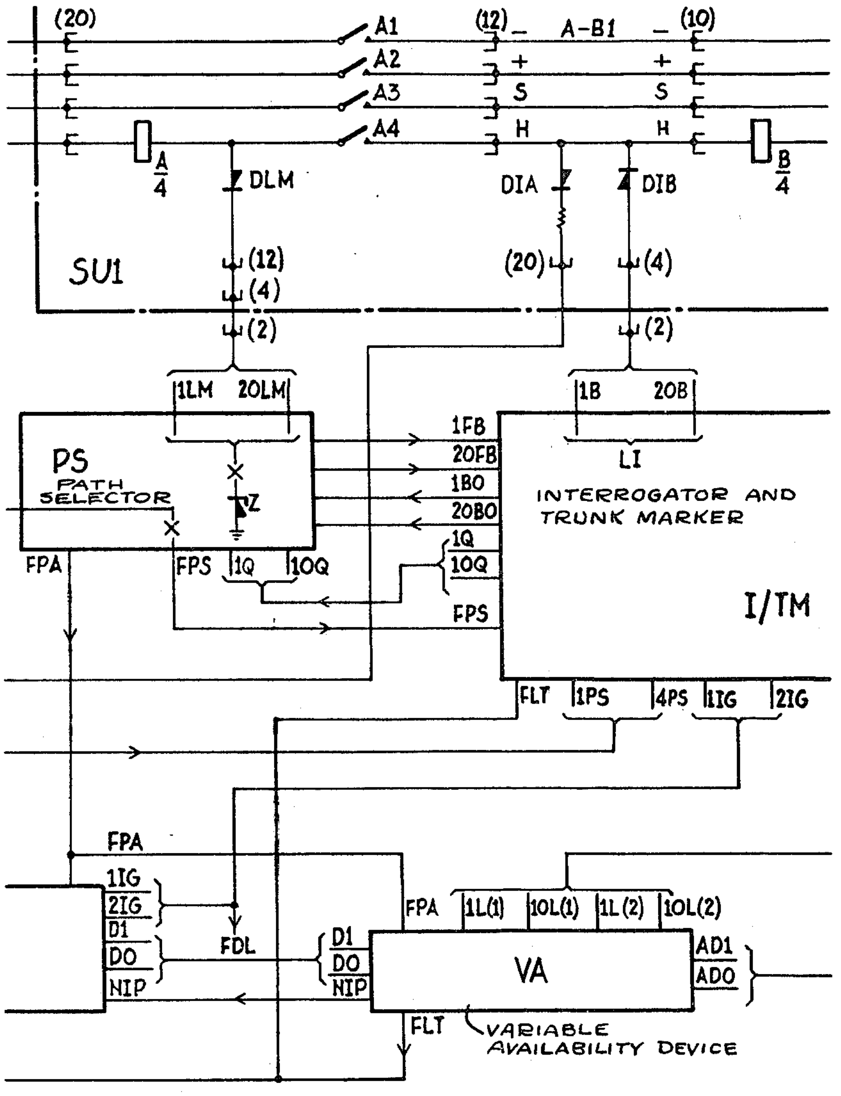
Figure 4:
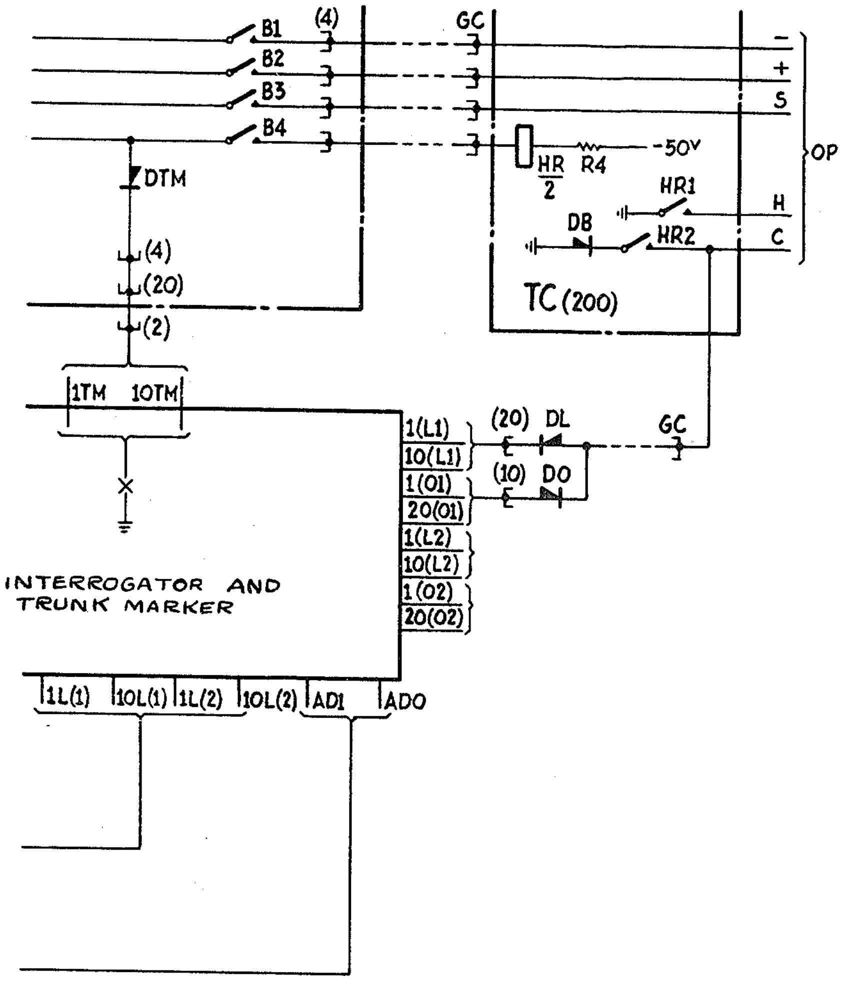
Figure 5:
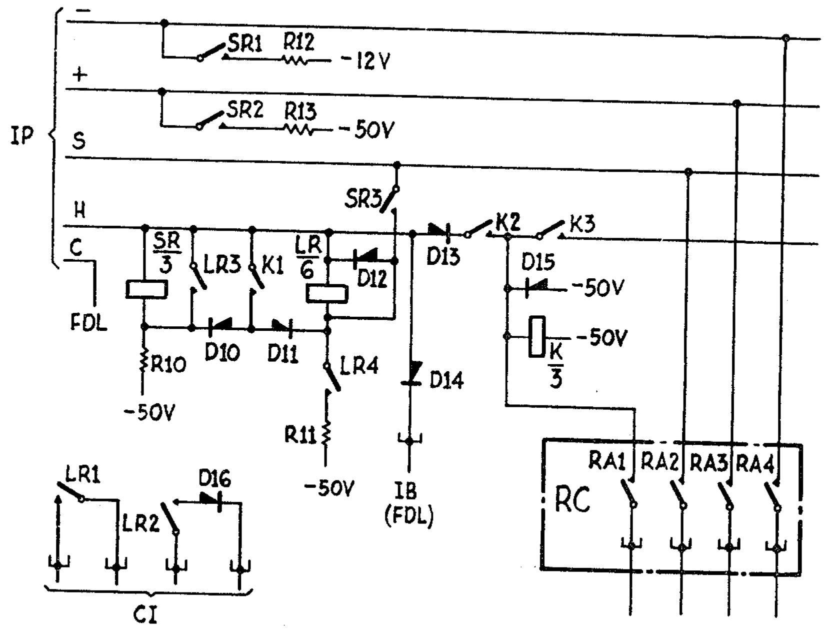

Of the drawings, FIG. 1 illustrates the general trunking pattern of two identical group-selector switching units or networks which are to be controlled by a single common control equipment, whereas FIGS. 2 to 4 when placed side by side in that order show circuit arrangements (abbreviated where necessary to ease of understanding) involving those switching units and the associated control equipment. FIG. 5 illustrates an alternative to the access circuit designated AC in FIG. 2.

Referring to the trunking diagram FIG. 1, the switching unit SU1 comprises four A or primary switches AS1 to AS4 and twenty B or secondary switches BS1 to BS20, all the switches being of the co-ordinate or matrix type, involving preferably reed-type relays arranged in rows and columns. Indeed it will be convenient to refer to the relays of the A switches as A crosspoint relays, and those of the B switches as B crosspoint relays. The A switches each have twelve inlets (horizontals) and twenty outlets (verticals) whereas each B switch has four inlets and ten outlets. The particular switching unit has 48 inlets and 200 outlets provided by the A and B switches respectively.

Forty-eight access circuits AC1 to AC48 are associated with switchiing unit SU1, those of a first set of twelve, namely AC1 to AC12, being individually connected to inlets of switch AS1, and the remaining similar sets being connected to inlets of switches AS2, AS3 (not shown) and AS4 respectively. Twenty links A–B1 to A–B20 emerge from switch AS1 and are distributed respectively to inlet 1 of each of the B switches, whereas further sets of twenty links A–B21 to A–B40, A–B41 to A–B60, and A–B61 to A–B80, emerging from switches AS2, AS3 and AS4 respectively are distributed respectively to inlets 2, 3 and 4 of the twenty B switches.

The 200 outlets of switching unit SU1 are divided into ten sets, conveniently to be referred to as levels and designated LEV1 to LEV10 in the relevant part of drawing. Each level involves corresponding outlets of switches BS1 to BS20 so that level LEV1 comprises twenty outlets being outlets 1 of those B switches, and so on.

It will be obvious that any access circuit in the set AC1 to AC12 has access over 20 links A–B1 to A–B20, to all outlets of the switching unit SU1, and likewise any access circuit of any of the other three sets has access to all outlets of switching unit over a choice of twenty related links.

The second switching unit SU2 is identical to the one already outlined but in this case another 48 access circuits AC49 to AC96, terminating in sets of twelve at inlets of A switches AS5 to AS8, are provided with access to a separate block of 200 outlets by way of links A–B81 to A–B160 and B switches BS21 to BS40. These outlets are again arranged in ten levels of twenty outlets each.

Although the two switching units SU1 and SU2 are controlled in respect of the actual setting up of through connections by a single common control arrangement, they are, from the point of view of routing of traffic quite separate in that each handles calls from a different group of 48 incoming paths to a different block of nominally 200 outlets. In the simplest form of utilisation of the group selecting arrangement, the ten levels of each switching unit are appropriate to separate 20-outlet groups rendered individually accessible by an appropriate single digit ("1" to "0") received by a register incorporated in the common control equipment. Thus levels LEV1 to LEV10 of switching unit SU1 each constitute a 20-outlet group appropriate to a different digit forthcoming in respect of a call over one of access circuits AC1 to AC48, whereas levels LEV1 to LEV10 of switching unit SU2 represent outlet groups for different digits in respect of calls using access circuits AC49 to AC96.

However as an alternative to working on the basis of one level per digit, each switching unit independently can provide for combining any pair of levels to cater for one or more (up to five) outlet groups having 40 outlets.

It will be appreciated, that, if so required, the outlet groups of each switching unit may be graded with other switching units to outgoing trunks, in accordance with common telephone switching practice. Indeed outlets of two-motion selectors may be included in the grading.

Reference will now be made to the abbreviated circuit diagram comprising FIGS. 2, 3 and 4 which will first be discussed in general terms.

GENERAL.—The typical access circuit AC connected to the five-wire incoming path IP is one of 48 (AC1 to AC48) serving the group selector switching unit SU1, just as a second set of 48 access circuits serve the identical switching unit SU2. The switching unit SU1, which comprises 240 A crosspoint relays in each of four primary switches AS1 to AS4, 40 B crosspoint relays in each of twenty secondary switches BS1 to BS20, is represented by one of each type of relay and the intervening links A–B1. Thus if the access circuit shown is that designated AC1 in FIG. 1, the particular A relay is one of twenty forming a horizontal of switch AS1, the twenty A relays being capable of connecting that access circuit to the twenty links A–B1 to A–B20. In this case the typical link A–B1 is accessible, over twelve A crosspoint relays forming a vertical of switch AS1, from access circuits AC1 to AC12. On the other hand, link A–B1 is accessible to one outlet (outlet 1) of each of the relevant ten outlet levels, by way of ten B crosspoint relays comprising a "horizontal" of switch BS1. Similar remarks also apply to other links concerned with switch AS1 and its other access circuits, except of course that these links are each accessible over crosspoint relays of horizontals of other B switches. Comparable arrangements are applicable in the case of the remaining links of switching unit SU1, and the "common" symbols (4) associated with the typical outlet (extending over a grading to an outgoing trunk circuit TC) infers that four corresponding links, one from each of A switches AS1 to AS4, are related to that outlet.

The 96 inlets of the two group selector switching units SU1 and SU2, and the related access circuit AC1 to AC96 are arranged for operative connection on a mutually exclusive basis to the common control equipment, and for this purpose a register connector involving 96 relays, such as RA, is provided. Each such relay is related to an individual access circuit.

The common control equipment incorporates a plurality of functional units shown in block form. These preferably involve electronic circuits and electronically controlled relay circuits, and are:

(a) a call isolating device—CI.

(b) a digit register—SREG to be referred to as the stage register as distinct from a main register which may be used in the overall control of the routing of a call.

(c) a variable availability device VA which is for particular use if either or both switching units is to provide access to one or more outlet groups comprising two outlet levels.

(d) an interrogator and trunk marker—I/TM.

(e) a path selector—PS.

(f) a release control device—RELC and (g) a fault detector and lock-out device FDL.

SEIZURE OF ACCESS CIRCUIT.—In the absence of a busy condition (earth) at the C wire of the incoming path IP, the typical access circuit AC may be taken into use over that path. The busying condition if present, is normally extended forwardly to the C wire, although calls to the access circuit AC, as to the others, may be inhibited by the earth connected to the C wires of sets of twelve of them by way of lock-out leads 1LO to 8LO of the fault detector and lock-out device FDL in the unlikely event of a major fault having occurred. Isolating diodes such as D5 are included in the individual C wire paths to the device FDL.

The access circuit may be taken into use, for instance, over a group selector arrangement, such as represented in the drawings, under control of a register exercising overall control of the routing of calls. That register is adapted to present a digit, in the high-speed form of coded D.C. voltage levels, to the conductors of the eventual speech path, for utilisation at the group selection stage, the nature of the next and subsequent digits signals whether of the same high-speed form or loop-disconnect form being determined in accordance with the type of the ensuing switching stages.

In any event the access circuit, preparatory to seizure, is busied by earth received at the C wire. Seizure is effected by earth then advanced to the H lead of the path IP, and this operates relay LR in series with resistor R1. The earth condition at lead H is also made available by way of diode D3 and lead IB to the fault detection and lock-out device FDL. However with relay LR operated, contacts LR1, which are connected in parallel with similar contacts of corresponding relays LR of the eleven other access circuits associated with the same A switch, extend the +12 v. supply, at resistor R2, to an appropriate one of eight input leads 1X to 8X to the call isolator C1. The marking of the particular lead signifies to the latter that an access circuit relevant to a particular A switch is demanding attention. Also with relay LR operated, contacts LR2 complete a path between one of eight leads 1Y to 8Y and one of twelve leads 1Z to 12Z of the call isolator. Each lead Y is connected to contacts LR2 of the twelve access circuits associated with a particular A switch. Each Z lead is connected, over diodes such as D1, to contacts LR2 of eight access circuits appropriate to corresponding inlets of the A switches, thus lead 1Z is connected to access circuits AC1, AC13, AC25, AC37, AC49, AC61, AC73 and AC85, whereas the lead 12Z is connected to access circuits AC12, AC24, AC36 . . . AC96.

It can be deduced that with the particular relay LR operated, the call isolator is provided with sufficient information to identify the particular access circuit, and in the absence of any other effective demand from any of the remaining access circuits, the call isolator applies a marking potential (earth) to one of eight leads 1S to 8S (earth) and another marking potential (−12 v.) to one of twelve leads 1I to 12I. Both sets of leads extend to the register connector RC, and the particular combination of marked leads, being relevant to the demanding access circuit, causes operation of that one of the 96 relays, such as RA, which is appropriate to that access circuit. Accordingly the incoming —, + and S conductors of the particular access circuit, which extend to corresponding conductors of the relevant A switch inlet, are connected by way of contacts RA4, RA3 and RA2 to the stage register SREG; the conductor S being connected to one of eight leads 1SS to 8SS according to which A switch is associated with the access circuit. A potential forthcoming at the S wire of the incoming path IP, and applied to one of leads 1SS and 8SS effects seizure of the stage register besides providing the latter with the identity of the A switch concerned. Also with the particular relay RA operated, contacts RA1 connect the common lead ILM of the register to relay K of the individual access circuit, preparatory to operation of that relay and the performance of the inlet-marking function.

Leads 1I to 12I and 1S to 8S of the call isolator, extend to the fault detector and lock-out device FDL to advise that device, when required, of the identity of the operative access circuit.

Besides bringing about operation of the appropriate register connector relay RA, the call isolator applies a potential (−50 v.) to one of its eight leads 1A to 8A according to which of the A switches AS1 to AS8 respectively is associated with the demanding access circuit. Each of these leads is connected to a separate set of twenty diodes such as DIA (by way of an individual resistor) for the purpose of interrogating the twenty links emanating from the particular A switch as to their idle or busy states. The other side of each said diode is connected to the H wire of the relevant link, that wire having a potential of approximately −10 v. present upon it only if the link is busy. The interrogator and trunk marker I/TM has twenty leads 1B to 20B for link interrogation purposes, each such lead branching out to eight diodes such as DIB terminating on the H wire of an individual link of the two switching units SU1 and SU2. Referring to FIG. 1, the arrangement is such that the H wires of the eight links relevant to outlets 1 of all A switches (both switching units) are connected by individual diodes DIB to lead 1B of the device I/TM, and in a like manner the H wires of links relevant to outlets 2 to 20 respectively of the A switches are associated with leads 2B to 20B. The outcome of the arrangement of the network comprising 160 diodes DLA and 160 diodes DIB is that, when one of leads 1A to 8A of the call isolator is energised in accordance with the identity of the A switch serving the operative access circuit, a significant condition is produced (by way of a series pair of diodes DIA and DIB) at each of those leads 1B to 20B which now appertains to an idle link from the defined A switch. Thus the identity of all idle links from the particular A switch is communicated to the interrogator and trunk marker.

In the meantime the call isolator CI also energises one of its four leads 1PS to 4PS according to the A switch location of the operatively seized access circuit. Thus lead 1PS, 2PS, 3PS or 4PS is exclusively energised if the access circuit is associated with an A switch 1AS or 2AS, 3AS or 4AS, 5AS or 6AS or 7AS or 8AS respectively. These four discriminating leads are connected to the interrogator and trunk marker I/TM where they are used to signify which of the two switching units SU1 and SU2 is to be employed on the call. Also within the interrogator and trunk marker the 1-out-of-4 marking condition is translated to the marking of one of two output leads 1IG and 2IG extending to the stage register SREG and the fault detector and lock-out circuit FDL. The marking of lead 1IG signifies to the latter that switching unit SU1 serving access circuits AC1 to AC48 is involved, whereas the marking of lead 2IG advises that the other switching unit SU2 associated with access circuit AC49 to AC96 to be used. In the stage register the energisation of lead 1IG or 2IG taken in conjunction with the digit duly to be received by the register SREG enables that register to be pre-conditioned according to whether the next succeeding selection equipment is to be responsive to a digit (i.e. the one following that which is to be operative on the present group selector) in the high-speed or the loop-disconnect form. It is to be noted that the digit which is duly to be received by register SREG, is of itself insufficient to give the necessary discrimination since, for a given value of received digit, one of the switching units SU1 and SU2 may route calls to two-motion selectors (responsive to loop-disconnect digital impulses) comprising the next stage, whereas the other may route calls to selection arrangements requiring the same high-speed form of digital signalling as that used in the present selector arrangements. However the preconditioning of the stage register is also required, to determine the point at which the release of the control equipment is to be duly initiated.

It may be mentioned that the call isolator CI incorporates two interconnected lock-out circuits, one of which identifies that one of eight sets of twelve access circuits (AC1 to AC12, AC13 to AC24, and so on) containing the operative circuit, while the other is concerned with isolating the particular access circuit of any set. Moreover, once any access circuit is operative upon the call isolator, the effect of the lock-out circuits is to ensure that no subsequently seized access circuit can be dealt with until after completion of the pending connection through the group selector. Furthermore the lock-out circuits of the call isolator ensure that if two or more access circuits are seized at the same time only one of them is chosen to effect operation of its individual RA relay and so permit its exclusive connection to the stage register.

SEIZURE OF STAGE REGISTER.—At the time of seizure of the stage register SREG, by the condition applied from lead S of the incoming path IP, that register returns a "proceed-to-send" signal to its leads + and −, and, with a relay RA of the register connector operated, this signal is transmitted backwardly over the incoming path and thence to the main register excercising overall control of the present call. The signal is typically a low-voltage positive potential connected to each lead, and its reception at the remote register is indicative of the valid state of the inter-register signalling path. Reception of the "proceed-to-send" signal causes the remote register to transmit the required routing-digit already stored therein, the digit being transmitted at high speed, as a short duration signal comprising one of a plurality of preferably negative potentials on each leg of the transmission path. The digit-signal effectively masks the "proceed-to-send" signal which in any event is inhibited when the digit-signal has been operative in the register.

In the meantime seizure of the register results in the connection of holding conditions by way of lead RH to the call isolator CI and the release control device RELC.

The digit-signal is decoded and staticised by the register so that one of ten relays relevant to digits "1" to "0" incorporated in it, is operated, and applies a marking potential to the appropriate one of ten leads D1 to D0 extending to the variable availability device VA.

At this juncture it is convenient to assume that all outlet groups of both switching units SU1 and SU2 comprise nominally 20 outlets each. In this event it may be taken that the input leads D1 to D0 and output leads AD1 to AD0 of the variable availability device are connected through, i.e. lead D1 to lead AD1 and so on. Thus leads D1 to D0 of the stage register extend to leads AD1 to AD0 of the interrogator and trunk marker I/TM. With one of these leads marked in accordance with the digit received by the stage register, the interrogator and trunk marker is enabled to proceed with its functions, since it has already received, from the call isolator (leads 1PS to 4PS), information as to the identity of the switching unit NSU1 to SU2 presently involved.

INTERROGATION, PATH SELECTION AND MARKING.—The marking of one of the ten leads AD1 to AD0 of the interrogator and trunk marker in connection with the digit stored in the stage register brings about operation of an appropriate one of ten relays. One effect of this is to cause energisation of the appropriate one of ten leads 1Q to 10Q of the path selector PS. Another effect is to operate that one of ten so-called "route-defining" relays which, together with means responsive to the switching-unit (SU1 to SU2) identifying signal already received by the interrogator and trunk marker from the call isolator, is to define the required outgoing route associated with an outlet-level of the particular switching unit.

Concurrently with the energisation of one of the path selector leads 1Q to 10Q by the interrogator and trunk marker, the latter causes the correspondingly numbered one of the ten so-called "trunk-marking" leads, 1TM to 10TM, to be energised by earth potential. In the case of a call to a level LEV1 route (either switching unit) lead 1TM is so marked, whereas in the case of succeeding levels the marking of an individual one of leads 2TM to 10TM respectively would occur. Each of these leads is connected to twenty sets of four diodes such as DTM in each of the two switching units. As regards the 160 diodes associated with each of leads 1TM to 10TM each set of four is relevant to the four B crosspoint relays of each of the corresponding "verticals" of all the B switches (both switching units). Thus lead 1TM is associated with those twenty sets of four diodes appertaining to outlets of level LEV1 in each of the 40 B switches, and similarly leads 2TM to 10TM by the relevant sets of diodes appertain to outlets of levels LEV2 to LEV10 respectively.

It follows that in the typical case of call to level LEV1 of either switching unit, SU1, and SU2, the trunk marking earth at lead 1TM constitutes a priming condition for the diodes of the 160 B crosspoint relays related to the two levels designated LEV1.

It will be recalled that each switching unit SU1 and SU2 gives access to a different block of 200 trunk circuits such as TC in ten groups of twenty, the trunk circuits being made accessible where necessary and as inferred by the grading commons GC, from outlets of other group selectors of the kind being described. Each trunk circuit may extend to a subsequent selection stage or to an outgoing junction relay set or the like. In any event the outgoing path OP may additionally be accessible from electromechanical group selectors.

The idle or busy state of each trunk circuit is evidenced by the condition of its lead C, the absence of potential from that lead signifying idle whereas the presence of earth signifies busy. However there is one other condition which must be interpreted as busy, and this obtains under that possible circumstance when an electromechanical group selector is in process of testing for the idle or busy condition of the trunk circuit whereupon that group selector is presenting negative battery over its testing relay to the C lead.

For interrogation purposes, each C lead of those 200 trunk circuits served by switching unit SU1 is connected to the junction of two diodes such as DL and D0, there being 200 of each in the diode network which in practice is incorporated in the interrogator and trunk marker.

The C leads of the trunk circuits served by switching unit SU2 are similarly connected with respect to a second diode network.

One network of 200 diodes DL and 200 diodes D0 is associated with leads 1(L1) to 10(L1) and 1(01) to 20(01) of the interrogator and trunk marker in respect of switching unit SU1, whereas the other identical diode network is associated with lead 1(L2) to 10(L2) and 1(02) to 20(02) in respect of switching unit SU2. Now with a particular route-defining relay of the interrogator and trunk marker I/TM operated in respect of the present call, and the latter device conditioned according to the identity of the particular switching unit being employed, an interrogating potential (−50 v.) is applied to the appropriate one of leads 1(L1) to 10(L1) or leads 1(L2) to 10(L2). Typically if the call is for the route relevant to level LEV1 of switching unit SU1, then that interrogating potential is applied to lead 1(L1) which is connected to those twenty diodes DL terminating upon the twenty trunk circuits TC of the required outlet-level.

At this time, the present conditioning of the interrogator and trunk marker, in accordance with the identity of the switching unit involved, is effective in connecting twenty interrogation elements individually to the twenty leads 1(01) to 20(01) or 1(02) to 20(02). Thus on the present assumption that switching unit SU1 is handling the call, the interrogation elements are connected to leads 1(01) to 20(01). Each of these leads is connected to an individual set of ten diodes, such as D0, each of which is relevant to a separate trunk circuit TC of a corresponding outlet of the ten levels of switching unit SU1. Thus the ten diodes D0 of lead 1(01) are related to trunk circuits terminated at outlet 1 of the ten levels of switching unit SU1, and the ten diodes of lead 20(01) are relevant to trunk circuits of outlet 20 of the said ten levels.

The situation, with respect to the typical call, is that by the application of the interrogating potential to lead 1(L1), a significant condition is produced (by way of a series pair of diodes DL and D0) at each of those of the twenty leads 1(01) to 20(01) which now appertains to an idle trunk circuit of the defined route, an idle trunk circuit being one which does not have busying earth at its C lead and which is not about to be seized by a testing electromechanical group selector. Thus all the trunk circuits of the group which are at present available for use are so defined at inputs of interrogation elements individually associated with leads 1(01) to 20(01).

Referring briefly to FIG. 1, and considering the typical outlet-level LEV1 of switching unit SU1 comprising outlets 1 to 20 which extend to corresponding trunk circuits (TC), it is observed that these outlets are derived from corresponding outlets ("verticals") of each of the B switches BS1 to BS20, and that these successively numbered outlets of the level are individually accessible over links derived from similarly 1 numbered outlets ("verticals") of each of the A switches AS1 to AS4. Similar remarks also apply to other outlet levels of switching unit SU1, and of course switching unit SU2 is identically arranged.

It will be recalled that in the typical case of a call from an access circuit of switch AS1 (switching unit SU1), the call isolator CI by the energisation of the first of leads 1A to 8A initiated interrogation of the twenty links A–B1 to A–B20 emanating from outlets 1 to 20 of that A switch. As a result, the idle ones of those links are defined by characteristic conditions received at the relevant ones of leads 1B to 20B respectively of the interrogator and trunk marker I/TM. These twenty leads, taken in order, are connected to inputs of the previously mentioned interrogation elements also associated (in the present case of a switching unit SU1 call) with the outlet interrogation leads 1(01) to 20(01) respectively. Of the twenty interrogation elements, those which are relevant to both an idle outlet and an idle link are now activated and are individually effective in extending a signal to the path selector by way of a corresponding one of the twenty leads 1BO to 20BO, to signify that each relevant path is available for use.

The identity of all these pertinent idle paths is staticised within the path selector and the fact that one or more such paths exists is promptly signalled to the stage register SREG and the variable availability device VA over the single lead FPA.

The signal received over lead FPA by the stage register causes the latter to transmit a signal backwardly to that register which is exercising overall control of the call. The latter register thereupon removes the D.C. coded digit signal from the — and + conductors incoming to the stage register. As a result of this the stage register performs the important function of causing a +50 v. source at resistor R3 (270 ohms) to be connected to its lead ILM whence it is extended by way of contacts RA1 of the exclusively operated relay RA (1 of 96) of the register connector to the operative access circuit which is typically that designated AC1 in FIG. 1. The +50 v. "line-marking" condition effects operation of relay K which at contacts K1 initiates the slightly delayed release of relay LR. Also with relay K operated, contacts K2 prepare for advancement of the incoming H lead by way of diode D2 which is at present backed-off by the +50 v. condition received from the stage register. Diode D4, included for surge suppression purposes, is also backed off. However the closure of contacts K3 extends the positive marking condition, to the twenty A crosspoint relays of that "horizontal" of, in this case, switch AS1, serving the operative access circuit. This is preparatory to the operation of one of those crosspoint relays in accordance with the link and level outlet to be nominated for use.

The positive marking condition is substantially unaffected by the presence of the operate coil of relay K which has a high value, typically 6,760 ohms.

The path selector now nominates an idle path (corresponding link and outlet) for use, which in the case of there being more than one path available is preceded by a selection function which is performed in a predetermined order-of-choice manner.

As regards the selection function, it is pointed out that the path selector includes a bistable device which is arranged to change its state on successive calls handled by the group selector. This device when in one state in respect to a level LEV1 call enables the outlets (and their allied links) to be submitted to the order of choice 1, 2, 3, 4 . . . 19, 20 whereas in the other state the order of choice is 2, 1, 4, 3 . . . 20, 19. This variation of order of choice by appropriately reversing the outlets of each successive pair, is particularly advantageous when under light traffic conditions an attempted call is unsuccessful possibly due to an internal fault condition. Under those circumstances, a second attempt by the caller, while the bistable device is in the alternative state, provides the opportunity of using another through path. The outlet reversal procedure is applicable to all levels of both switching units.

The path selector also provides an appreciable degree of distribution of the traffic over the B switches of each of the two switching units by providing different starting points for the selection process in respect of the different levels. The order of choice in respect of the various outlet levels, assuming the previously mentioned bistable device is encountered in its first state, is given below:

| | Outlet Number | | | | | | | | | |
|---|---|---|---|---|---|---|---|---|---|---|
| Lev. | 1 | 2 | 3 | 4 | 5 | 6 | 7 | 8 | 9 | 0 |
| Order of choice: | | | | | | | | | | |
| 1 | 1 | 19 | 17 | 15 | 13 | 11 | 9 | 7 | 5 | 3 |
| 2 | 2 | 20 | 18 | 16 | 14 | 12 | 10 | 8 | 6 | 4 |
| 3 | 3 | 1 | 19 | 17 | 15 | 13 | 11 | 9 | 7 | 5 |
| 4 | 4 | 2 | 20 | 18 | 16 | 14 | 12 | 10 | 8 | 6 |
| 5 | 5 | 3 | 1 | 19 | 17 | 15 | 13 | 11 | 9 | 7 |
| 6 | 6 | 4 | 2 | 20 | 18 | 16 | 14 | 12 | 10 | 8 |
| 7 | 7 | 5 | 3 | 1 | 19 | 17 | 15 | 13 | 11 | 9 |
| 8 | 8 | 6 | 4 | 2 | 20 | 18 | 16 | 14 | 12 | 10 |
| 9 | 9 | 7 | 5 | 3 | 1 | 19 | 17 | 15 | 13 | 11 |
| 10 | 10 | 8 | 6 | 4 | 2 | 20 | 18 | 16 | 14 | 12 |
| 11 | 11 | 9 | 7 | 5 | 3 | 1 | 19 | 17 | 15 | 13 |
| 12 | 12 | 10 | 8 | 6 | 4 | 2 | 20 | 18 | 16 | 14 |
| 13 | 13 | 11 | 9 | 7 | 5 | 3 | 1 | 19 | 17 | 15 |
| 14 | 14 | 12 | 10 | 8 | 6 | 4 | 2 | 20 | 18 | 16 |
| 15 | 15 | 13 | 11 | 9 | 7 | 5 | 3 | 1 | 19 | 17 |
| 16 | 16 | 14 | 12 | 10 | 8 | 6 | 4 | 2 | 20 | 18 |
| 17 | 17 | 15 | 13 | 11 | 9 | 7 | 5 | 3 | 1 | 19 |
| 18 | 18 | 16 | 14 | 12 | 10 | 8 | 6 | 4 | 2 | 20 |
| 19 | 19 | 17 | 15 | 13 | 11 | 9 | 7 | 5 | 3 | 1 |
| 20 | 20 | 18 | 16 | 14 | 12 | 10 | 8 | 6 | 4 | 2 |

It is noted that the outlets forming each pair 1 and 2, 3 and 4, 5 and 6 . . . 19 and 20 are reversed in order of choice in respect of each level when the bistable device is in its second state. Thus in the case of level LEV5 call (switching unit SU1 or SU2) the order of choice would be 14, 13, 16, 15, 18, 17, 20, 19, 2, 1, 4, 3, 6, 5, 8, 7, 10, 9, 12, 11 when the bistable device is in said second state.

The starting point of the idle path testing procedure performed by the path selector, is determined according to which one of its ten leads 1Q to 10Q has received a signal from the interrogator and trunk marker, and, as already mentioned, this is determined in accordance with the digit stored by the stage register.

In the path selector, upon the selection of the idle path (link and outlet) which is to be used, the appropriate one of twenty relays is operated at high-speed. One effect of the operation of such a relay is that it extends so-called "fast-busy" earth to the relevant one of twenty leads 1FB to 20FB extending to the interrogator and trunk marker whence it is transmitted over the corresponding one of twenty leads 1(01) to 20(01) in the case of a switching unit SU1 call, or to one of leads 1(02) to 20(02) in the case of switching unit SU2 call. The fast-busy earth is promptly extended to the C lead of the chosen trunk circuit pending application of the permanent guarding earth to that lead.

The operated path-selection relay of the path selector also completes a distinctive connection to fault print-out access equipment (not shown) to be used in conjunction with the fault detection and lock-out device FDL which is to be brought into use in the event of the call being unsuccessful due to an internal fault. The device FDL is connected to the fault print-out equipment over the path FPO, another path FA also being utilised to give pertinent audible and/or visual alarms under conditions of fault.

Another effect of the operation of the typical path selection relay (or any one of them) is to cause a potential now standing on lead SI of the call isolator CI to be extended by the path selector over lead FPS to the interrogator and trunk marker I/TM. This causes the operated "route-defining" relay in the latter to be released in order to terminate the now completed path interrogating function.

Yet another effect of operation of the particular path-selection relay in the path selector is that it extends the earth-connected Zener diode Z by way of the appropriate one of leads 1LM to 20LM. Each of these leads extends to eight groups of twelve isolating diodes, such as DLM, the diodes of each group being individually connected to the A crosspoint relays of corresponding "verticals" in the eight A switches (both switching units). Thus lead 1LM is relevant to the "vertical" of outlet 1 of each of A switches AS1 to AS8, lead 2LM is relevant to the "vertical" of outlet 2 of those switches, and so on. If, for example, the lead 1LM is marked, this infers that an outlet 1 of one of the levels, together with a link appropriate to outlet 1 of one of the eight A switches, has been selected for use, and accordingly the Zener diode is presented to that set of twelve diodes DLM, in each of the twelve A switches, which are connected individually in series with an A crosspoint relay of those forming the outlet 1 "vertical" of the switch. Of the 96 A crosspoint relays involved only one is in the condition of having a positive potential as its left-hand coil terminal, the particular A crosspoint relay being one of twenty comprising the "horizontal" associated with the operative access circuit, typically AC1. Accordingly that crosspoint relay A is exclusively energised with its conducting diode DLM, the Zener diode Z "breaking-down" with approximately 16 volts across it.

With the A crosspoint relay operated, contacts A1, A2 and A3 advance to the —, + and S wires of the incoming path IP to the requisite link (typically A–B1). Also contacts A4 extend the marking potential, derived from the Zener diode and being approximately +16 v., to the H wire of the particular link and thence to the ten B crosspoint relays constituting a particular "horizontal" of a particular B switch of the switching unit being employed. In the present example, the "horizontal" is that which appertains to inlet 1 of switch BS1, i.e. link A–B1.

Of the ten B crosspoint relays receiving +16 v. over the link, only one is included in the 160 which have their diode DTM marked by earth received from lead 1TM of the interrogator and trunk marker. In the example, that is the one corresponding to outlet 1 of level LEV1 of switching unit SU1 alone. This B relay is therefore operated in series with its now-conducting diode DTM, whereupon its contacts B1, B2 and B3 complete the connection by way of the chosen link, between the —, + and S conductors of the incoming path IP and the corresponding conductors of the outgoing path OP. Contacts B4 in operating, extend the substantially earth potential, derived from lead 1TM, to the H lead of the chosen trunk circuit TC. This enables relay HR to operate in series with resistor R4 connected to —50 v. Thereupon contacts HR1 extend seizing earth via lead H to the equipment ahead, whereas contacts HR2 apply busying earth, at diode DB, to the forwardly extending C lead independently of the previously mentioned temporary fast-busying earth derived over the interrogator and trunk marker.

Typically the value of resistor R3 in register SREG is 270 ohms, relay K in the access circuit is 6,760 ohms, crosspoint relays A and B are 500 ohms, and relay HR and resistor R4 in the trunk circuit TC are approximately 600 and 900 ohms respectively.

In the meantime, the operation of relay K in the access circuit has initiated the release of relay LR, and when this occurs contacts LR1 and LR2 disconnect the initial input markings to the call isolator, but at present the state of the latter remains unchanged, its pertinent identification relays being maintained due to a hold condition forthcoming from the stage register over lead RH.

As already mentioned, the selector of the subsequent stage, which is now taken into use over the path OP, may be of the kind being described or it may be of the electromechanical type to be controlled over a loop in known manner. However the stage register SREG has been conditioned, in accordance with its stored digit and the switching-unit defining signal (lead 1IG and 2IG) for monitoring the through-connection to the equipment ahead. This involves checking for the appearance of the next D.C. coded digit signal at the + and — conductors in the case of the equipment ahead using this form of signalling, or, in the case of a loop-controlled equipment, the return of a balanced battery feed condition over the + and — conductors together with a potential returned over lead S.

The encountering of the appropriate one of these two conditions stated above is taken as evidence by the stage register of the establishment of a valid through-connection by the group selector whereupon the inlet marking (+50 v.) condition is removed from lead ILM of the stage register. Accordingly diode D2 in the access circuit is rendered conducting and means within the stage register, and associated with lead ILM, respond to the earth condition present at the incoming H lead. This H lead constitutes the forward holding condition to maintain the access circuit relay K and to maintain the crosspoint relays A and B and relay HR of the trunk circuit all in series with resistor R4. Moreover the earth condition presented to lead ILM of the stage register causes the release sequence of the common equipment to be started in that an "initiate-release" signal is transmitted over lead IR to the release control device RELC and the holding condition is removed from lead RH extending to the device RELC and the call isolator. The register in releasing, releases the variable availability device, whereas the call isolator releases the particular relay RA of the register connector and releases the path selector and interrogator and trunk marker. With the control equipment now in its released or quiescent state it is available to be used on a subsequent call to be routed over switching unit SU1 or SU2.

It is opportune to mention at this juncture that in the access circuit AC (FIG. 2), contacts K3 are employed in advancing the positive marking condition (derived from lead ILM of register SREG) to appropriate A crosspoint relays. In fact these contacts may be omitted from the lead without detriment to the operation of the group selector and in this case the marking would go forward without awaiting operation of relay K. However in the quiescent state of access circuit, the contacts K3 serve to isolate the crosspoint relays from the operate coil of relay K, so that a maintenance officer may perform certain tests upon the switching unit without affecting the access circuit. The use of a diode in place of contacts K3 will retain the necessary isolation, the sense of the diode being such as to permit conduction during forward marking and forward holding functions of the access circuit. An advantage which accrues from the use of the diode, is that, in conjunction with the diode D4, it suppresses any large voltage surge by the winding of an A cross-point relay when a through-connection is being released, in that the left-hand side of the winding is clamped to −50 v. during such periods.

In those cases where an outlet level of the group selector arrangement gives access to a succeeding selection stage comprising electro-mechanical selectors of the conventional loop-seized two-motion type, it is not necessary to use trunk circuits such as those designated TC in FIG. 4. The inlet path of such a two-motion selector generally comprises two speech conductors and a private wire, the latter having guarding earth returned to it on seizure of the selector. The outcome is that in these circumstances relay HR is not required in the trunk circuit since the outgoing path to the selector does not include leads H and C. With relay HR removed the value of resistor R4 is increased to compensate, and this resistor duly provides the path for operating a B crosspoint relay and for holding the A and B crosspoint relays of a through connection. The S conductor of the outgoing path extending to the private wire of the two-motion selector is also connected to the grading common associated with appropriate interrogation diodes DL and D0 which are conditioned by the selector according to its idle or busy state.

Variable availability device.—The main purpose of the variable availability device VA is to cater for a maximum of five 40-outlet groups in respect of either or both of the switching units SU1 and SU2. Any combination of two 20-outlet levels in one switching unit may form such an outlet group, and any remaining levels may be individually accessible as 20-outlet groups. The device VA also incorporates means for detecting the "no-idle-path" condition which may prevail during the interrogation of any of the groups.

Both these facilities entail the provision of twenty signalling conductors between the interrogator and trunk marker I/TM and he variable availability device. These conductors comprise two sets 1L(1) to 10L(1) and 1L(2) to 10L(2), each conductor being arranged to be energised, during any interrogation process, on a mutually exclusive basis as determined by the route-defining (i.e. level) relay operated and the switching unit (SU1 or SU2) concerned. Thus energisation of a lead 1L(1) to 10L(1) would signfy that a level LEV1 to LEV10 respectively of switching unit SU1 was being interrogated and similarly a signal over a lead 1L(2) to 10L(2) would signify that a level LEV1 to LEV10 respectively of switching unit SU2 was subject to interrogation.

In the case of those groups comprising 20 outlets (i.e. one level only) the relevant ones of the above-mentioned 20 leads are connected over a so-called input strapping-field of the variable availability device to either of two enabling leads (switching units SU1 and SU2 respectively) of a "no-idle-path" element included in said device. This element includes an electromagnetic relay having an operate time of the order of 1 milli-sec. during which period the element may be disabled and operation of the relay prevented, by the reception of a signal over lead FPA from the path selector. This signal signifies there is at least one idle path appertaining to the outlet level (20 outlet group) currently being interrogated. However if no such signal is forthcoming, in the period specified, operation of the "no-idle-path" relay matures, and contacts of that relay extend a signal, by way of lead NIP, to the stage register. The latter thereupon transmits a distinctive congestion signal back to the register exercising overall control of the call, as a result of which the latter register causes (a) busy tone to be made audible to the calling party and (b) the forward holding condition to be removed from the incoming path IP of the access circuit and from the stage register. With the holding condition so removed the access circuit and group selector control equipment are released in readiness for acceptance of another call.

As already mentioned, when it was assumed that all outlet groups of switching units SU1 and SU2 were of 20-outlets each (i.e. outlet group per level), the operated digit relay of the stage register, by energising the relevant one of leads D1 to D0 determines that a particular one of the route-defining relays of the interrogator and trunk marker I/TM is to be operated, and for this purpose leads D1 to D0 (digits) and leads AD1 to AD0 (outlet levels) of the device VA are through-connected by way of a so-called output strapping field of that device.

Bearing in mind that the so-called route-defining relays (and their interposed relays) controlled over leads AD1 to AD0 are each concerned with an outlet level in each switching unit, each of the digit leads D1 to D0, which are to be used to define a 20-outlet group in either or both switching units are, as before, connected over the output strapping field to the relevant one of the "level" leads AD1 to AD0. As regards each 40-outlet group involving two levels of the same switching unit, the particular digit lead is strapped to that one of leads AD1 to AD0 which corresponds to the first of the two levels to be interrogated. Taking an example: if levels LEV2 and LEV3 of switching unit SU1 form a 40-outlet group accessible by digit "2" and level LEV2 is to be interrogated initially, "digit" lead D2 is strapped to lead AD2 to enable the route-defining relay appropriate to level LEV2 to be operated in the interrogator and trunk marker I/TM, and this relay, in conjunction with means responsive to the condition signifying that switching unit SU1 is involved, will institute the interrogation of the desired first-choice level (LEV2) of switching unit SU1. If levels LEV2 and LEV3 of switching unit SU2 are likewise combined and accessible by digit "2," no further strapping of leads D2 and AD2 is required. On the other hand, if the last-mentioned levels are separate 20-outlet groups, accessible by, say, digits "2" and "3" respectively, the strapping between leads D2 lead AD2 is retained and lead D3 is strapped to lead AD3. Identical strapping would be applicable if levels LEV2 and LEV3 of switching unit SU2 were combined to give a 40-outlet group accessible by digit "2" and levels LEV2 and LEV3 of switching unit SU1 formed separate groups accessible by digits "2" and "3" respectively. It can be deduced that the arrangements will give complete flexibility as regards allocation of 20- and 40-outlet groups within each switching unit, the rule in respect of the strapping involving the "digit" leads D1 to D0 and the "level" leads AD1 to AD0 being that each of leads AD1 to AD0, which is appropriate to a 20-outlet (one level) group or to a first-choice level of a 40-outlet group, in either or both switching units, is connected to a particular one of leads D1 to D0 according to the access digit.

Now to provide for a maximum of five 40-outlet (two levels) groups for each switching unit, two sets of five group-extension elements are incorporated in the variable availability devices VA, each element having separate activating, holding and inhibiting leads at its input side. The activating and holding leads have an appearance in the input strapping field of device VA whereas the inhibiting leads are arranged to be energised over lead FPA (idle path available) under control of the path selector.

As already mentioned leads 1L(1) to 10L(1) and 1L(2) to 10L(2) of the variable availability device also terminate upon the input strapped field and, during the interrogation process appertaining to any outlet level, an individual one of said leads is energised taking into account the level and the switching unit concerned. It will be recalled that in the case of a 20-outlet group, the particular lead is strapped to one of two enabling leads (for switching units SU1 and SU2) of the "no-idle-path" element which is arranged to become operative in the absence of an "idle-path-available" signal.

However in the case of a 40-outlet group, that particular lead which is energised during interrogation of the first-choice level, instead of being strapped as described, is strapped to the activating lead of an individual group-extension element. This typical element, when so activated, initiates operation of its attendant electromagnetic relay which has an operate lag of the order of 1 milli-sec. during which period the interrogation function relevant to the first-choice level is performed. If this function results in the path selector determining that an idle path is available, a signal consequently transmitted over lead FPA inhibits the group-extension element, and establishment of a connection through the group selector proceeds as before without reference to the second-choice outlet level.

On the other hand if there is no idle path relevant to the initial level of the group, no signal is forthcoming over lead FPA and the operation of the group-extension relay is allowed to mature. This relay provides for self-holding to the condition present on the "digit" lead to (D1 to D0), and is effective over the output strapping field of the variable availability device in (a) releasing the so-called route-defining relay (and its interposed relay) of the first-choice outlet level and (b) operating the route-defining relay (and its interposed relay) of the second-choice level. Thus interrogation of the first-choice outlet level ceases and interrogation of the second-choice level proceeds. The newly operated route-defining relay additionally causes a particular one of leads 1L(1) to 10L(1) and 1L(2) to 10L(2) to be energised and since this typical lead is terminated upon one of the two enabling lead of the "no-idle-path" element, the possibility of no idle path being available in respect of the second-choice level is prepared for. If the path selector determines that a path is available, the signal received over lead FPA inhibits the "no-idle-path" element, and establishment of a connection over the appropriate switching unit takes place; whereas if no such path is encountered, actuation of said element is allowed to mature with identical results to those which appertained under the "no-idle-path" condition for a 20-outlet group.

Access circuit with delayed register seizure.—As an alternative to the access circuit described and appearing in FIG. 2, the circuit illustrated in FIG. 5 may be used. The alternative circuit provides for delayed seizure of the stage register and the other control equipment, and may be used with considerable advantage where the group selector is used in or conjunction with exchanges not employing registers (or suitable registers) for the overall control of calls.

In exchanges of this kind, so called digit conversion equipments would be provided in respect of routes extending over group selectors (one or more stages in succession) on the basis of one for each inlet path of the earlier stages. These conversion equipments receive digits in loop-disconnect form and convert such as are necessary to the D.C. coded form already alluded to. The equipments, having storage capacity for one digit at a time, are relatively inexpensive and when used in conjunction with the modified access circuits obviate the occupation of a stage common control equipment during any periods when the digit to be used in its stage register is not yet stored in the conversion equipment, as may be the case if delays occur in the dialling procedure.

In considering the method of operation of the access circuit of FIG. 5, it will be assumed that it is directly accessible from a conversion equipment, the latter having been taken into use over a selector in response to a digit in loop-disconnect form.

In the absence of busying earth from the C lead, the circuit is seized by earth applied to the H lead of the incoming path. The earth is made available over diode D14 and lead IB to the fault detector and lock-out circuit FDL, and moreover operates relay SR in series with resistor R10 connected to −50 v. In the present case, contacts SR1 and SR2 are ineffectual, and indeed may be left disconnected, but contacts SR3 connect the incoming S lead to relay IR.

Only when the next digit has been received and stored by the conversion equipment does the conversion equipment advance a negative battery potential to the incoming lead S. This infers that the digit is now available for transmission to the stage register in D.C. coded form, the condition of the incoming S and H leads now being such as to cause relay LR operate over contacts SR3, the diode D12 (included for surge suppression purposes) being backed off.

With relay LR operated, contacts LR3 initiate the slightly-delayed release of relay SR by applying a short-circuit, whereas contacts LR4 provide for the holding of relay LR, in series with resistor R11 independently of the battery condition at the S lead which is disconnected after a short period.

Contacts LR1 and LR2 apply, as in the case of the access circuit described, identifications marking to the call isolator CI.

Upon the access circuit being nominated by the call isolator, the relevant relay RA of the register connector RC is operated. This completes connection between the −, + and S wires of the inlet and the register, and in due course relay K is operated as in the earlier access circuit. Contacts K3 mark the apropriate A switch "horizontal" with a positive potential (lead ILM) and together with contacts K2 prepare for through-connection of the H lead, but diode D13 is backed off. Contacts K1 apply the H lead earth to relay LR via diode D11, and this initiates the slightly delayed release of relay LR. The earth over contacts K1 and extending by way of diode D10 ensures that relay SR once released will remain so.

When the group selector has completed the establishment of a connection through the A and B switches, the lead ILM marking is withdrawn and as before relay K, and the A, B and HR relays of the through-connection are maintained by earth on the incoming H lead.

If the present group selector has switched into a succeeding selector of the loop-controlled type, the battery feed condition at its incoming + and − conductors and earth returned over the S conductor is immediately detected by the present stage register and the release of the control equipment of the group selector is initiated as before; the seized selector awaits transmission of the digit (loop-disconnect type) by the conversion equipment.

However if the first group selector has switched into an access circuit of a similar group selector and that access circuit is of the kind shown in FIG. 5, then relay SR is operated as described so that contacts SR3 prepare for the operation of relay LR. Additionally contacts SR1 and SR2 by connecting −12 v. and −50 v. source over resistors R12 and R13 to the incoming − and + conductors are now effective upon the register of the first group selector. Indeed the signal conditions provided over contacts SR1 and SR2 are such as to be interpreted by that stage register as though a battery feed condition or a D.C. coded digit were present. Accordingly, with earth, at the incoming H lead of the newly-seized access circuit made available to the operative stage register by way of the coil of relay LR and the access circuit incoming lead S, the release of the common equipment including the stage register is initiated leaving the connection over the first group selector maintained under control of holding earth derived from the conversion equipment.

The latter common equipment is thus made available for use on any subsequent call, whereas the newly seized access circuit withholds any demand for use of its associated common equipment pending the arrival of a short duration negative signal over the S conductor from the conversion equipment. This will avoid unnecessary occupancy of that common equipment which remains available for use on cells.

However as soon as the conversion equipment has the next digit available for transmission, the short duration negative signal is applied by said equipment to operate relay LR of the waiting access circuit. Relay LR then holds due to the earth at the incoming H lead, releases relay SR and initiates a demand for the service of the relevant control equipment. Relay SR disconnects the backward signal. The second stage-register is duly connected to the demanding access circuit and is effective in controlling the advancement of the call in the manner already described.

As was described with reference to the access circuit shown in FIG. 2, contacts K3 of the alternative access circuit of FIG. 5 may be replaced by a diode.

Although in the foregoing description, the group selector arrangement has been concerned with the setting up of connections over two switching networks, each comprising A and B switches, by the various functional units of one control equipment, it will be appreciated to those skilled in the art that the latter may be readily adapted to the control of more than two switching networks. As an example, four switching networks may be employed, each giving twenty-four inlet circuits access to 200 outlets over two (12 x 20) A and twenty (2 x 10) B switches by way of 40 links. In this case any operative inlet circuit in any of the four sets would be effective in causing the call isolator, now slightly modified, to produce a signal appropriate to that of the four networks which is to be employed. This signal would be operative in the relevant, and again slightly modified functional units, to steer the call through the appropriate network taking into account the digit duly received by the register.

We claim:

1. A group selector arrangement including at least one switching network comprising a plurality of primary and secondary matrix switches consisting of electromagnetic crosspoint relays and interconnected by links on the basis that each primary switch is connected to each secondary switch over an individual link, a plurality of inlets for the switching network and comprising the inlets of each of said primary switches, a plurality of access circuits individually included in paths to said inlets of the switching network, a plurality of outlets for the switching network, said outlets being formed into levels each consisting of corresponding outlets of the secondary switches, control equipment for the switching network, means for rendering said control equipment operative exclusively in respect of any one seized access circuit, said control equipment including means for defining all the links which emanate from the primary switch serving the seized access circuit, means for registering digital information appropriate to any one of said levels and extended by said seized access circuit, means for interrogating, as to their idle or busy states, each outlet of a digitally defined level in conjunction with that of said defined links giving access to it, means for nominating for use one idle outlet of said digitally-defined outlets and its related link of those interrogated, means operative in said seized access circuit to extend a marking potential to the associated inlet of the related primary switch and means for generating marking conditions appropriate to the nominated link and all outlets of the defined level, said marking potential together with said marking conditions first connecting the access circuit to the nominated link by the operation of a unique crosspoint relay of the primary switch serving the seized access circuit and then connecting the nominated link to the nominated outlet by the operation of a unique crosspoint relay of the secondary switch to which the nominated link is connected.

2. A group selector arrangement as claimed in claim 1 and including two switching networks each having a different group of access circuits at its inlets and means for generating a signal significant of the identity of the group containing the seized access circuit, the signal being effective to determine that the control equipment shall be operative in respect of the digitally-selected outlet group of that switching network serving the particular group of access circuits.

3. A group selector arrangement as claimed in claim 1 and including a variable availability device in said control equipment to enable any two or all of the levels of the switching network to be combined in pairs giving access to extended outlet groups, the arrangement of the device being such that when the register has received a digit signal appropriate to an extended outlet group, indicating means appropriate to that group is operative in said device to instruct the interrogation means to perform interrogation functions with respect to outlets of a first level of the combined pair whereupon if the interrogation is successful (i.e. outlet and link available) a signal produced by response means in the control equipment in addition to initiating the setting-up of a connection as aforesaid is effective in said device to prevent the interrogation means from initiating interrogation functions in respect of the outlets of the second level of the pair whereas if the interrogation is unsuccessful (i.e. no outlet and link available) the absence of said signal permits said device to condition the interrogation means to perform its interrogation functions in respect of the outlets of the second level instead of the outlets of the first level preparatory to a connection being set up to an idle outlet of the second level by way of the related idle link.

4. A group selector arrangement as claimed in claim 3, wherein if the interrogation of the only level of an outlet group or the second level of an extended group is unsuccessful the variable availability device produces a signal which initiates release of the access circuit, the control equipment and the connector means.

5. A group selector arrangement including at least one switching network comprising a plurality of primary and secondary matrix switches of the kind consisting of electromagnetic crosspoint relays and interconnected by links on the basis that each primary switch is connected to each secondary switch over an individual link, a plurality of inlets for the switching network and comprising the inlets of each of said primary switches, a plurality of access circuits individually included in paths to said inlets of the switching network, a plurality of outlets for the switching network, said outlets being formed into levels each consisting of corresponding outlets of all the secondary switches, control equipment for the switching network, means for rendering said control equipment operative exclusively in respect of any one seized access circuit, said control equipment including:

(a) discriminating means responsive to the seizure of any access circuit for defining all the links which emanate from the primary switch serving the seized access circuit amongst others (b) a digit register responsive to a digit signal significant of a required outlet level and forthcoming over the access circuit (c) interrogation means arranged to be set in accordance with any digit received by said register to interrogate each outlet of the appropriate level in combination with that of said defined links giving access to it to determine which combinations are idle (d) response means responsive to an indication appropriate to the or each idle combination encountered to produce a signal indicating that at least one combination is idle and to nominate that idle combination or one of them for use (e) a first source of potential operative as a result of said last mentioned signal to uniquely condition the seized access circuit to extend a first marking to the inlet side of the operate coils of all the crosspoint relays relevant to the seized access circuit in the primary switch to which the access circuit is connected (f) a second source of potential selectively connectable by said response means to extend a second marking to the link side of the operate coils of the crosspoint relays appertaining to the chosen link and to corresponding links of the other primary switches (g) a third source of potential selectively connectable according to the setting of said interrogation means to extend a third marking to the outlet side of the operating coils of all those secondary switch crosspoint relays concerned with outlets of said appropriate level the first and second markings effecting the operation of a unique primary switch crosspoint relay which thereupon connects the seized access circuit to the chosen link and moreover connects the operative marking evident at the link side of that crosspoint relay to the link side of the operate coils of those crosspoint relays in one secondary switch which are appropriate to the chosen outlet and to corresponding outlets of other levels, said operative marking together with said third marking serving to operate that one of the last-mentioned crosspoint relays which connects the chosen link to the chosen outlet.

6. A group selector arrangement as claimed in claim 5 and including a plurality of outgoing truck circuits each one connected to one outlet of the switching network and each including resistance means connected between a conductor of said chosen outlet and a fourth source of potential.

7. A group selector arrangement as claimed in claim 6, wherein said resistance means includes the operate coil of a relay, the relay of the outgoing trunk circuit connected to the chosen outlet being operative as a result of said third marking being extended to said conductor when connection to the outlet is established.

8. A selector arrangement including a switching network comprising a succession of multi-inlet and multi-outlet co-ordinate switches each consisting of electromagnetic crosspoint relays, a plurality of access circuits connected to the inlets of the first in the succession of switches, control equipment serving the switching network, discriminating means, connector means, means in said access circuits for establishing appropriate identity-significant connections to said discriminating means whereby said discriminating means controls said connector means to operationally connect the access circuits on a mutually exclusive basis to said control equipment, at least some of said access circuits having first, second and third electromagnetic relays and an incoming path including first and second conductors, the first relay being actuated upon persistent application of a signal to the first conductor to prepare for actuation of the second relay on the subsequent occurrence of a signal at the second conductor, the actuation of the second relay by the latter signal serving to establish the identity-significant condition to said discriminating means.

9. A selector arrangement as claimed in claim 8, wherein actuation of the second relay initiates release of the first, the second relay is maintained by the signal at the first conductor exclusively.

10. A selector arrangement as claimed in claim 9, wherein the signal occurring at the second conductor is of short duration.

11. A selector arrangement as claimed in claim 10, wherein a source of potential forthcoming over the connector means is effective in operating one third relay and in producing a marking condition at a forwardly extending conductor of the access circuit.

12. A selector arrangement as claimed in claim 11, wherein operation of the third relay effects release of the second and prevents re-operation of the first.

13. A selector arrangement as claimed in claim 12, wherein the disconnection of said source of potential in the actuated state of the third relay renders the signal at the first conductor operative to maintain said third relay and permits said signal to be evident at said forwardly extending conductor.

14. A selector arrangement as claimed in claim 13 wherein upon actuation of said first relay by the signal applied to said first conductor of the incoming path, a signalling condition is returned to at least one other conductor of the incoming path.

References Cited

UNITED STATES PATENTS

| | | |
|---|---|---|
| 2,999,131 | 9/1961 | Edstrom. |
| 3,294,920 | 12/1966 | de Kroes et al. |
| 3,324,249 | 6/1967 | Cotroneo et al. |
| 3,382,324 | 5/1968 | Shirasu et al. |
| 3,395,253 | 7/1968 | Warman. |

KATHLEEN H. CLAFFY, Primary Examiner

WILLIAM A. HELVESTINE, Assistant Examiner